United States Patent [19]

Johnson et al.

[11] Patent Number: 4,615,119

[45] Date of Patent: Oct. 7, 1986

[54] BLADE FOR A VIBRATORY CUTTER

[75] Inventors: David S. Johnson; Everett L. Haas, both of Bristol, Tenn.

[73] Assignee: JHJ Enterprises, Gainesville, Ga.

[21] Appl. No.: 603,935

[22] Filed: Apr. 26, 1984

[51] Int. Cl.⁴ .............................................. B26B 7/00
[52] U.S. Cl. ...................... 30/276; 30/347; 30/357; 30/263
[58] Field of Search ............. 30/276, 347, 355, 357, 30/263, 264

[56] References Cited

U.S. PATENT DOCUMENTS

| | | | |
|---|---|---|---|
| 2,886,889 | 5/1959 | Adamer et al. | 30/355 X |
| 3,346,956 | 10/1967 | Wezel et al. | 30/355 X |
| 3,358,370 | 12/1967 | Logan | 30/355 X |
| 3,605,841 | 9/1971 | Lindstrom et al. | 30/263 X |

FOREIGN PATENT DOCUMENTS 629170 3/1935 Fed. Rep. of Germany ........ 30/263

Primary Examiner—E. R. Kazenske
Assistant Examiner—Willmon Fridie, Jr.
Attorney, Agent, or Firm—Mitchell B. Wasson; Martin P. Hoffman; Charles W. Fallow

[57] ABSTRACT

A blade for a vibratory cutter having a plurality of serrated teeth. A plurality of first teeth provided on one side of the center line of the blade are angled in one direction, and a plurality of second teeth provided on the second side of the center line are equally angled to the first set of teeth in the opposite direction. When used in conjunction with a vibratory tool, the blade will sever material in two directions parallel to the surface endeavored to be cut.

8 Claims, 4 Drawing Figures

FIG. 1.
FIG. 4.
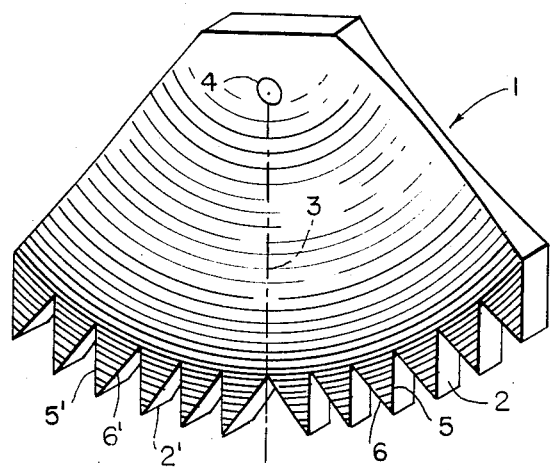
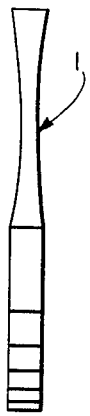
FIG. 2.
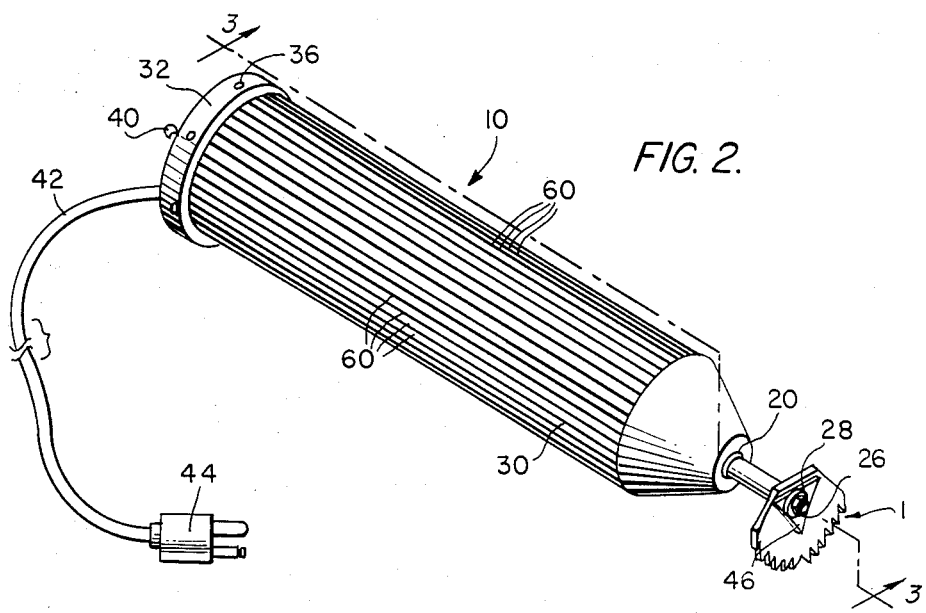
FIG. 3.
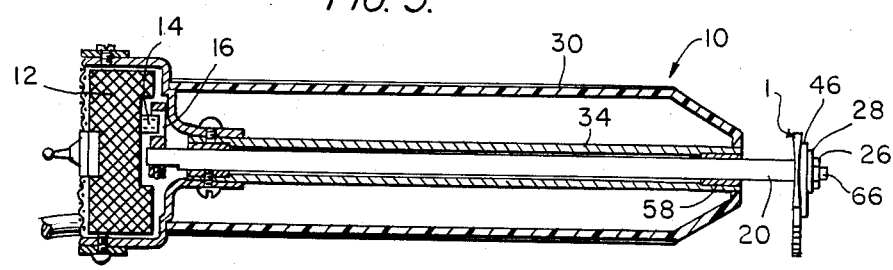

BLADE FOR A VIBRATORY CUTTER

BACKGROUND OF THE INVENTION

Prior art blades used in conjunction with vibratory cutters utilize a cutting surface having a plurality of teeth which are angled in one direction with respect to a workpiece which is to be cut. These teeth usually have a set angle between two adjacent teeth to facilitate the cutting action when the blade vibrates in one direction, as well as providing a raking action to dispose of pulverized material when the blade vibrates in a second direction, thereby freeing the blade teeth of waste accumulation. Therefore, when vibrated, a cutting action takes place when the blade moves in one direction, and no cutting action takes place during the raking action, when the blade moves in the opposite direction. Consequently, prior art vibratory cutting blades only produce a cutting action for only one-half of the entire cutting cycle and, additionally, due to the set angle between two adjacent teeth, an extremely precise cut is not possible. These types of blades actually cut only one half of the line. Therefore, a vibrating blade which can cut in both of these vibratory directions would be quite advantageous.

A number of patents have issued which describe cutting blades having all of the teeth angled in one direction on one side of the blade, and angled in the opposite direction on the other side of the blade. Typical of these prior art cutting blades are U.S. Pat. No. 141,939 issued to Luppert et al and U.S. Pat. No. 3,929,050 issued to Salzwedel. Additionally, other patents of note include German Pat. No. 112078 (Aug. 6, 1900), German Pat. No. 189394 (Oct. 12, 1907), British Pat. No. 1703 (Jan. 25, 1893) and French Pat. No. 358429.

U.S. Pat. No. 3,929,050 issued to Salzwedel describes a reversible hacksaw blade which contains a plurality of teeth 2 angled in one direction on one side of the blade, and a plurality of teeth 2' oppositely angled to the first group of teeth provided on a second portion of the blade. The purpose of this particular configuration is to provide a reversibly mounted blade which would extend the life of the blade.

British Pat. No. 1703 describes a blade used in a band saw which contains teeth for cutting in one direction on one portion of the blade, and teeth angled in a second direction in another part of the blade so that the saw mill cut during both the up and down stroke of the machine.

Similarly, all of the above-cited references either relate to hacksaw or band saw blades and cannot be applied to the blade used for a vibratory cutter described herein.

SUMMARY OF THE INVENTION

The problems of the prior art are overcome inasmuch as the present invention is directed to a blade used with a vibratory cutter having a plurality of serrated teeth provided on one side of the center line of the cutting blade angled in a first direction, and a plurality of serrated teeth provided on the second side of the center line angled in a second direction, the angles of the teeth provided in either side of the center being equal to one another. The cutting blade is arcuate in nature and each tooth is slightly receded with respect to its adjacent tooth as the teeth lie farther and farther from the center line. This blade vibrates or oscillates in a back-and-forth motion in a plane parallel with the object to be severed. The blade cuts in two directions parallel to this surface, and will operate with a penetrating force for deepening the depth of severance. Both cutting actions, i.e. across the surface to be severed as well as into the surface to be severed, combine to dislodge material upon which the blade is operating. Additionally, a raking action simultaneously occurs to dispose of any pulverized material, thereby freeing the blade teeth of waste accumulation.

This particular blade can be utilized with virtually any vibratory cutter. An example of such a cutter is U.S. Pat. No. 4,328,819 issued to Everett Haas, a co-inventor of the present invention. This patent is incorporated herein by reference.

BRIEF DESCRIPTION OF THE DRAWINGS

A more complete appreciation of the present invention will be readily obtained as the same becomes understood by reference to the following detailed description when considered in connection with the accompanying drawings, wherein:

FIG. 1 is a perspective view of the vibrating blade;

FIG. 2 is a perspective view of the blade provided upon a vibratory cutter;

FIG. 3 is a cross-sectional side elevation of the vibratory cutter shown in FIG. 2; and FIG. 4 is a side view of the vibrating blade shown in FIG. 1.

DESCRIPTION OF A PREFERRED EMBODIMENT

Referring to the drawings, FIG. 1 illustrates a vibratory cutting blade 1 which can be utilized in a vibratory or oscillatory cutter. The blade can be constructed of virtually any material dependent upon the material which is to be cut. Typical materials which can be utilized to construct the blade include stainless steel, carbide or diamond. A plurality of serrated teeth 2 are provided on one side of the center line 3 of a concave relief blade having an arcuate cutting surface. The concavity of the blade is shown in FIG. 4. Each tooth 2 has an acutely angled cutting relief surface 6 as well as a rake surface 5 which is parallel to the center line 3. Similarly, a plurality of serrated teeth 2' is provided on the second side of the center line 3. These teeth are angled oppositely and equally to the teeth 2 and contain such an acutely angled relief surface 6' as well as a rake surface 5' which is parallel to the center line 3. The particular angle of each of the teeth 2 and 2' can be altered dependent upon the material which is to be cut. Because each of the teeth is provided on an arcuate surface, each tooth is slightly receded with respect to its adjacent tooth as the distance from the center line 3 increases. Additionally, each of the teeth 2 and 2' are equal in size. In this manner, each tooth, when in use, will vibrate across a small arc of action. A hole 4 is provided such that the blade 1 can be affixed to a suitable cutter.

All of the teeth 2, 2' are parallel to one another and provided in the same plane, and as the progressive cutting length of the blade increases, the depth of severance is also progressively increased by both the vibratory motion of the cutting edges of the blade teeth as well as from the penetrating action on the teeth caused by a perpendicular force applied to the blade from a source of control such as an operator or machine.

Additionally, because the teeth vibrate across an arc, the pressure applied would allow penetration of the material to be severed bringing into cutting action additional teeth further from the center line 3. This process is continually repeated such that additional teeth progressively engage the material, and the cutting efficiency of the blade is increased.

The particular configuration of this blade enables a cutting action to occur in both the forward and backward motions of the blade across the cutting surface.

Although not limited in scope, this particular blade can be utilized with the vibratory tool described in U.S. Pat. No. 4,328,819. This tool can be utilized to cut human nails, human bones or for many other uses. As shown in FIGS. 2 and 3, the cutting tool 10 is predominantly cylindrical in shape and contains a case cover 30, as well as a motor cover 32 which would substantially encase the entire length of the cutter 10. A sleeve tubing 34 extends within the case 30 for substantially the entire length of the cover. Although the exact material constituting the tubing 34, and covers 30 and 32 can vary, it has been found that a plastic or aluminum material provides satisfactory results. Flutes 60 are provided in the covers 30 and 32 for ensuring that the cutter can be easily gripped and manipulated. Set screws 32 are provided to protectively enclose the case cover 30 and motor cover 32 around the inner mechanism of the cutter 10. An AC variable speed electrical motor 12 can be provided in the proximal end of the cutter 10 to provide power. The speed of the motor is varialbe to eliminate friction, and the motor contains a rotating drive shaft 14. The shaft 14 is connected to an off-center cam bearing 16 which is used to convert the rotating movement of the motor drive shaft to vibratory motion used to cut the surface of a material. The cam bearing 16 is connected to a yoke positively connected by an elongated, cylindrical drive shaft 20 which is provided within the entire length of the sleeve tubing 34. Two bearings 58 encircle the drive shaft 20 at both ends thereof to provide efficient operation. The vibratory blade 1, having a plurality of teeth on at least one edge, is affixed to the distal end of the drive shaft 20 by means of a nut 26 and washer 28. A shield 46 can also be provided and is also affixed to the cutter by nut 26 and washer 28.

The distal end of the drive shaft 20 is threaded 66 to allow mating with the nut 26, and to ensure that the blade 1 will not become dislodged during operation of the cutter. As shown in U.S. Pat. No. 4,328,819, an off-center yoke is used to produce a vibartory motion which is transmitted to the blade 1.

A standard rotor or round switch 40 is provided on the exterior of the motor cover 32 to alter the speed of the variable speed motor and thereby the speed of the vibration of the blade, as well as to activate or cease the operation of the motor 12. The switch is positively affixed to the cover 32 by a plurality of set screws 76. The motor is connected to an external source of power via a standard three-wire cable 42 provided with a standard three-pronged plug 44. Although it is not shown, it should be noted that an external source of power is not necessary, and the motor 12 could be powered by a suitable battery source.

While the described embodiment represents the preferred form of the present invention, it is to be understood that modifications will occur to those skilled in the art without departing from the spirit of the invention. For example, a pneumatic motor of the cutter could be utilized in place of the electrical motor. It is therefore to be understood that within the scope of the appended claims, the invention may be practiced otherwise than as specifically described herein.

What is claimed is:

1. A blade for a vibratory or oscillatory cutter, said blade comprising:
    an arcuate cutting surface provided with a center line bisecting said arcuate cutting surface, said arcuate cutting surface subtending an angle less than 180°, and said blade provided with a mounting hole bisected by said center line;
    a plurality of first teeth provided on a first side of said center line, each of said first teeth provided with a rake angle and a relief angle, said rake angle and said relief angle for each of said first teeth being unequal to each other, and the relief angle for each of said first teeth angled only in a first direction with respect to said center line; and
    a plurality of second teeth provided on the second side of said center line, each of said second teeth provided with a rake angle and a relief angle, said rake angle and said relief angle for each of said second teeth being unequal to each other, and the relief angle of each of said second teeth angled only in a second direction with respect to said center line, the relief angle of each of said second teeth being equal but opposite to the relief angle of each of said first teeth;
    whereby a cutting action takes place on both the forward motions of said blade over a working surface.

2. The blade for a vibratory or oscillatory cutter in accordance with claim 1, wherein the rake angle of each of said first and second teeth is parallel to said center line.

3. The blade for a vibratory or oscillatory cutter in accordance with claim 1, wherein said blade is provided with a concave side relief.

4. The blade for a vibratory or oscillatory cutter in accordance with claim 2, wherein said blade is provided with a concave side relief.

5. A vibratory or oscillatory cutter powered by a source of power, a motor connected to the source of power, the motor having a rotatable drive shaft, a means connected to the rotatable drive shaft for producing vibratory or oscillatory motion, the improvement comprising:
    a blade connected to the means for producing vibratory or oscillatory motion, said blade having an arcuate cutting surface provided with a center line bisecting said arcuate cutting surface, said arcuate cutting surface subtending an angle less than 180°, said blade provided with a mounting hole bisected by said center line;
    a plurality of first teeth provided on a first side of said center line, each of said first teeth provided with a rake angle and a relief angle, said rake angle and said relief angle for each of said first teeth being unequal to each other, and the relief angle for each of said first teeth angled only in a first direction with respect to said center line; and
    a plurality of second teeth provided on the second side of said center line, each of said second teeth provided with a rake angle and a relief angle, said rake angle and said relief angle for each of said second teeth being unequal to each other, and the relief angle for each of said second teeth angled only in a second direction with respect to said center line, the relief angle of each of said second teeth being equal but opposite to the relief angle of each of said first teeth;

whereby a cutting action takes place on both the forward motions of said blade over a working surface.

6. The vibratory or oscillatory cutter in accordance with claim 5, wherein the rake angle of each of said first and second teeth is parallel to said center line.

7. The vibratory or oscillatory cutter in accordance with claim 5, wherein said blade is provided with a concave side relief.

8. The vibratory or oscillatory cutter in accordance with claim 6, wherein said blade is provided with a concave side relief.

* * * * *